US009214692B2

(12) United States Patent
Kim et al.

(10) Patent No.: US 9,214,692 B2
(45) Date of Patent: Dec. 15, 2015

(54) POLY(BENZIMIDAZOLE-CO-BENZOXAZOLE) AND METHOD FOR PREPARING THE SAME

(71) Applicant: KOREA INSTITUTE OF SCIENCE AND TECHNOLOGY, Seoul (KR)

(72) Inventors: Hyoung-Juhn Kim, Gyeonggi-do (KR); Eun Ae Cho, Seoul (KR); Jong Hyun Jang, Seoul (KR); Dae Ki Choi, Seoul (KR); Chang Won Yoon, Seoul (KR); Suk-Woo Nam, Seoul (KR); Dirk Henkensmeier, Seoul (KR); Tae Hoon Lim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 330 days.

(21) Appl. No.: 13/761,322

(22) Filed: Feb. 7, 2013

(65) Prior Publication Data
US 2013/0216935 A1 Aug. 22, 2013

(30) Foreign Application Priority Data

Feb. 20, 2012 (KR) ........................ 10-2012-0017115

(51) Int. Cl.
C08G 73/18 (2006.01)
C08G 73/22 (2006.01)
H01M 8/10 (2006.01)
C08L 79/04 (2006.01)

(52) U.S. Cl.
CPC .............. *H01M 8/103* (2013.01); *C08G 73/18* (2013.01); *C08G 73/22* (2013.01); *C08L 79/04* (2013.01); *H01M 8/1048* (2013.01); *Y02E 60/521* (2013.01)

(58) Field of Classification Search
CPC ................................ H01M 8/10; C08G 73/18
USPC .......................................... 528/423; 429/492
See application file for complete search history.

(56) References Cited

U.S. PATENT DOCUMENTS 5,525,436 A 6/1996 Savinell et al.
7,288,603 B2 10/2007 Sakaguchi et al.

FOREIGN PATENT DOCUMENTS

| JP | 60-092329 A | 5/1985 |
| KR | 10-0905688 B1 | 7/2003 |
| KR | 10-542203 B1 | 1/2006 |
| KR | 1020070084164 A | 8/2007 |

(Continued)

OTHER PUBLICATIONS

Jean-Philippe Belieres, et al; "Binary inorganic salt mixtures as high conductivity liquid electrolytes for >100° C. fuel cells", Chemical Communications, pp. 4799-4801; Published on web: Oct. 31, 2006.

(Continued)

*Primary Examiner* — Duc Truong
(74) *Attorney, Agent, or Firm* — Ladas & Parry LLP

(57) ABSTRACT

Provided is poly(benzimidazole-co-benzoxazole) having polybenzimidazole to which benzoxazole units are introduced, as a polymer electrolyte material. The polymer electrolyte material has both high proton conductivity and excellent mechanical properties even when it is obtained by in-situ phosphoric acid doping. The polymer electrolyte material may substitute for the conventional phosphoric acid-doped polybenzimidazole in a polymer electrolyte membrane fuel cell, particularly in a high-temperature polymer electrolyte membrane fuel cell.

20 Claims, 8 Drawing Sheets

(56) References Cited

FOREIGN PATENT DOCUMENTS

| KR | 100910117 B1 | 8/2009 |
|---|---|---|
| KR | 1020120001559 A | 1/2012 |

OTHER PUBLICATIONS

A. Carbone, et al; "Composite S-PEEK membranes for medium temperature polymer electrolyte fuel cells", Journal of Power Sources, vol. 178, pp. 661-666, Available online Oct. 13, 2007.

Sossina M. Haile, et al; "Superprotonic conductivity in $Cs_3(HSO_4)_2(H_2PO_4)$" Solid State Ionics, vol. 77, pp. 128-134; Apr. 1995.

J.R.P. Jayakody, et al; "NMR Studies of Mass Transport in High-Acid-Content Fuel Cell Membranes Based on Phosphoric Acid and Polybenzimidazole", Journal of The Electrochemical Society, vol. 154, Issue 2, pp. B242-B246; Available electronically Dec. 27, 2006.

You Mee Kim, et al; "Organic-inorganic composite membranes as addition of $SiO_2$ for high temperature-operation in polymer electrolyte membrane fuel cells (PEMFCs)", Electrochimica Acta, vol. 49, pp. 4787-4796, Available online Jul. 7, 2004

Yu Seung Kim, et al; "Fabrication and characterization of heteropolyacid $(H_3PW_{12}O_{40})$/directly polymerized sulfonated poly(arylene ether sulfone) copolymer composite membranes for higher temperature fuel cell applications", Journal of Membrane Science, vol. 212, Issues1-2, pp. 263-282, Feb. 15, 2003.

Jeong-Hi Kim, et al; "Dependence of the performance of a high-temperature polymer electrolyte fuel cell on phosphoric acid-doped polybenzimidazole ionomer content in cathode catalyst layer", Journal of Power Sources, vol. 170, pp. 275-280; Available online Apr. 22, 2007.

Tae-Ho Kim, et al; "High-temperature fuel cell membranes based on mechanically stable *para*-ordered polybenzimidazole prepared by direct casting", Journal of Power Sources, vol. 172, pp. 172-179, Available online Jul. 28, 2007.

Jeung Woo Lee, et al; "Synthesis and characterization of acid-doped polybenzimidazole membranes by sol-gel and post-membrane casting method", Journal of Membrane Science, vol. 357, pp. 130-133; Available online Apr. 14, 2010.

Q. Li, et al; "PBI-Based Polymer Membranes for High Temperature Fuel Cells-Preparation, Characterization and Fuel Cell Demonstration", Fuel Cells, vol. 4, No. 3, pp. 147-159, Article first published online: Jul. 29, 2004.

Li Qingfeng, et al; "Phosphoric acid doped polybenzimidazole membranes: Physiochemical characterization and fuel cell applications", Journal of Applied Electrochemistr, vol. 31, No. 7, pp. 773-779, Jul. 2001.

Y.-L. Ma, et al; "Conductivity of PBI Membranes for High-Temperature Polymer Electrolyte Fuel Cells", Journal of the Electrochemical Society, vol. 151, No. 1, pp. A8-A16, Available electronically Nov. 21, 2003.

Hirofumi Nakamoto, et al; "Proton-Conducting Properties of a Brønsted Acid-Base Ionic Liquid and Ionic Melts Consisting of Bis(trifluoromethanesulfonyl)imide and Benzimidazole for Fuel Cell Electrolytes", J. Physical Chemistry C, vol. 111, pp. 1541-1548, Published on Web Jan. 3, 2007.

Qingfeng Li, et al; "High temperature proton exchange membranes based on polybenzimidazoles for fuel cells", Progress in Polymer Science, vol. 34, pp. 449-477, Available online Feb. 7, 2009.

MD. A.B.H. Susan, et al; "Brønsted acid-base ionic liquids and their use as new materials for anhydrous proton conductors", Chemical Communications, pp. 938-939; Published on the web Mar. 18, 2003.

Singaram Vengatesan, et al; "High temperature operation of PEMFC: A novel approach using MEA with silica in catalyst layer", International Journal of Hydrogen Energy, vol. 33, pp. 171-178, Available online Nov. 19, 2007.

J.S. Wainright, et al; "Acid-Doped Polybenzimidazoles: A New Polymer Electrolyte", Journal of the Electrochemical Society, vol. 142, No. 7, Jul. 1995, pp. L121-L123.

J.-T. Wang, et al; "A $H_2/O_2$ Fuel Cell Using Acid Doped Polybenzimidazole as Polymer Electrolyte", Electrochimica Acta, vol. 41, No. 2, pp. 193-197, Feb. 1996.

D. Weng, et al; "Electro-osmotic Drag Coefficient of Water and Methanol in Polymer Electrolytes at Elevated Temperatures", Journal of the Electrochemical Society, vol. 143, No. 4, Apr. 1996, 1260-1263.

Lixiang Xiao, et al; "High-Temperature Polybenzimidazole Fuel Cell Membranes via a Sol-Gel Process", Chem. Mater., vol. 17, pp. 5328-5333, Published on Web Sep. 21, 2005.

L. Xiao, et al "Synthesis and Characterization of Pyridine-Based Polybenzimidazoles for High Temperature Polymer Electrolyte Membrane Fuel Cell Applications", Fuel Cells, vol. 5, Issue 2, pp. 287-295, Article first published online Apr. 4, 2005.

S. Yu, et al; "Durability Studies of PBI-based High Temperature PEMFCs▲" Fuel Cells, vol. 8, Issue 3-4, pp. 165-174, Article first published online Jul. 10, 2008.

Dong-Hoon Lee, et al; "Synthesis and characterization of phosphoric acid doped poly(benzimidazole-*co*-benzoxazole) membranes for high temperature PEM fuel cells", 217th ECS Meeting, Abrstact #1397; Apr. 25-30, 2010, 1 page.

POLY(BENZIMIDAZOLE-CO-BENZOXAZOLE) AND METHOD FOR PREPARING THE SAME

CROSS-REFERENCE TO RELATED APPLICATION

This application claims priority to Korean Patent Application No. 10-2012-0017115, filed on Feb. 20, 2012, and all the benefits accruing therefrom under 35 U.S.C. §119, the contents of which in its entirety are herein incorporated by reference.

BACKGROUND

1. Field

The present disclosure relates to poly(benzimidazole-co-benzoxazole) and a method for preparing the same. More particularly, the present disclosure relates to poly(benzimidazole-co-benzoxazole) (PBI-co-PBO), a polymer electrolyte including the same and a method for preparing the same, a polymer electrolyte membrane including the polymer electrolyte and a method for producing the same, and a membrane electrode assembly and a fuel cell using the polymer electrolyte membrane.

2. Description of the Related Art

Polymer electrolyte membrane fuel cells (PEMFC) capable of being operated at high temperature enhance catalytic activity while reducing the poisoning of a catalyst caused by carbon monoxide, and thus are suitable as fuel cells (Non-patent Documents 1-3).

Perfluorosulfonate polymers have been used widely as polymer electrolyte materials for polymer electrolyte membrane fuel cells. Although such perfluorosulfonate polymers have high chemical, mechanical and thermal stability and high proton conductivity, they show high proton conductivity only when they are humidified with water. Since the proton conductivity significantly depends on water content as mentioned above, the proton conductivity may be decreased, for example, when water evaporates at 100° C. or higher, resulting in degradation of the quality of a cell (Non-patent Documents 4 and 5).

Thus, many studies have been conducted to develop materials having high ion conductivity even under high temperature low-humidity or anhydrous conditions. Recently, intensive studies have been conducted about some electrolytes capable of conducting protons even under dry conditions.

For example, it has been reported that $CsHSO_4$ and $CsH_2PO_4$ show high conductivity approximately at 110° C. (Non-patent Document 6). Heteropolyacids have also been developed as fuel cell electrolytes. It has been found that heteropolyacids show high proton conductivity even under low relative humidity at room temperature (Non-patent Document 7). In addition, it has been reported that combinations of ammonium difluoride with different ammonium salts may be used as protic electrolytes in various temperature ranges (Non-patent Document 8). Further, acid-base composite protic ionic solutions containing organic amines or strong acids in ionic solution show high proton conductivity without humidification (Non-patent Documents 9 and 10).

Meanwhile, phosphoric acid having unique properties of thermal stability and high proton conductivity is applicable to fuel cells. Phosphoric acid has a proton conduction path similar to the Grottuss mechanism, and thus may provide high proton conductivity in the absence of water even at a high temperature more than 100° C. (Non-patent Document 11).

Therefore, many studies have been conducted to develop a phosphoric acid-doped poly[2,2'-(m-phenylene)-5,5'-bibenzimidazole] (PBI) membrane as an electrolyte material for a high-temperature polymer electrolyte membrane fuel cell (Non-patent Documents 12-19). Such phosphoric acid-doped polybenzimidazole requires no water to provide proton conductivity. Particularly, an acid-base composite having a strong acid, such as phosphoric acid, and PBI shows high proton conductivity. It is thought that this results from the hop and turn mechanism of protons and phosphoric acid molecules (Non-patent Documents 12 and 16).

A gel-like phosphoric acid-doped polybenzimidazole membrane has been produced by a polyphosphoric acid process (Non-patent Documents 19 and 20). In the corresponding process, a polybenzimidazole membrane is obtained in-situ from a polymerizable solution mixture. The membrane has high proton conductivity due to a high acid doping level, but is problematic in that it shows low mechanical strength. In addition, when the membrane is obtained in the form of a gel-like polymer matrix, it causes a significant drop in mechanical strength due to degradation of tensile strength (Non-patent Documents 18, 21 and 22). In general, the in-situ polybenzimidazole membrane has higher proton conductivity but lower mechanical strength as compared to the membrane not obtained by the in-situ process due to a high phosphoric acid doping level (Non-patent Document 21).

REFERENCES OF THE RELATED ART

Non-Patent Document (Non-patent Document 1) Y. M. Kim, S. H. Choi, H. C. Lee, M. Z. Hong, K. Kim, H.-I. Lee, Electrochimica Acta, 49 (2004) 4787-4796.

(Non-patent Document 2) Q. Li, R. He, J. O. Jensen, N. J. Bjerrum, Fuel Cells, 4 (2004) 147-159.

(Non-patent Document 3) D. Weng, J. S. Wainright, U. Landau, R. F. Savinell, Journal of The Electrochemical Society, 143 (1996) 1260-1263.

(Non-patent Document 4) S. Vengatesan, H. Kim, S. Lee, E. Cho, H. Yongha, I. Oh, S. Hong, T. Lim, International Journal of Hydrogen Energy, 33 (2008) 171-178.

(Non-patent Document 5) A. Carbone, R. Pedicini, A. Sacca, I. Gatto, E. Passalacqua, Journal of Power Sources, 178 (2008) 661-666.

(Non-patent Document 6) S. M. Haile, G. Lentz, K.-D. Kreuer, J. Maier, Solid State Ionics, 77 (1995) 128-134.

(Non-patent Document 7) Y. S. Kim, F. Wang, M. Hickner, T. A. Zawodzinski, J. E. McGrath, Journal of Membrane Science, 212 (2003) 263-282.

(Non-patent Document 8) J.-P. Belieres, D. Gervasio, C. A. Angell, Chemical Communications, (2006) 4799.

(Non-patent Document 9) M. A. B. H. Susan, A. Noda, S. Mitsushima, M. Watanabe, Chemical Communications, (2003) 938.

(Non-patent Document 10) H. Nakamoto, A. Noda, K. Hayamizu, S. Hayashi, H.-o. Hamaguchi, M. Watanabe, Journal of Physical Chemistry C, 111 (2007) 1541-1548.

(Non-patent Document 11) J. R. P. Jayakody, S. H. Chung, L. Durantino, H. Zhang, L. Xiao, B. C. Benicewicz, S. G. Greenbaum, Journal of The Electrochemical Society, 154 (2007) B242.

(Non-patent Document 12) J. S. Wainright, J.-T. Wang, D. Weng, R. F. Savinell, M. L. b, Journal of The Electrochemical Society, 142 (1995) L121-L123.

(Non-patent Document 13) Y. L. Ma, J. S. Wainright, M. H. Litt, R. F. Savinell, Journal of The Electrochemical Society, 151 (2004) A8.

(Non-patent Document 14) J. Kim, H. Kim, T. Lim, H. Lee, Journal of Power Sources, 170 (2007) 275-280.

(Non-patent Document 15) S. Yu, L. Xiao, B. C. Benicewicz, Fuel Cells, 8 (2008) 165-174.

(Non-patent Document 16) J.-T. WANG, R. F. SAVINELL, J. WAMRIGHT, M. Litt, H. Yu, Electrochimica Acta, 41 (1996) 193-197.

(Non-patent Document 17) Q. Li, J. O. Jensen, R. F. Savinell, N. J. Bjerrum, Progress in Polymer Science, 34 (2009) 449-477.

(Non-patent Document 18) T.-H. Kim, T.-W. Lim, J.-C. Lee, Journal of Power Sources, 172 (2007) 172-179.

(Non-patent Document 19) L. Xiao, H. Zhang, E. Scanlon, L. S. Ramanathan, E.-W. Choe, D. Rogers, T. Apple, B. C. Benicewicz, Chem. Mater., 17 (2005) 5328-5333.

(Non-patent Document 20) L. Xiao, H. Zhang, T. Jana, E. Scanlon, R. Chen, E.-W. Choe, L. S. Ramanathan, S. Yu, B. C. Benicewicz, Fuel Cells, 5 (2004) 287-295.

(Non-patent Document 21) J. W. Lee, D. Y. Lee, H.-J. Kim, S. Y. Nam, J. J. Choi, J.-Y. Kim, J. H. Jang, E. Cho, S.-K. Kim, S.-A. Hong, Journal of Membrane Science, 357 (2010) 130-133.

(Non-patent Document 22) L. Qingfeng, H. A. Hjuler, N. J. Bjerrum, Journal of Applied Electrochemistry, 31 (2001) 773-779.

SUMMARY

The present disclosure is directed to providing a novel polymer electrolyte material for use in a polymer electrolyte membrane or the like, particularly poly(benzimidazole-co-benzoxazole) having both high proton conductivity and excellent mechanical properties even when obtained by an in-situ phosphoric acid doping process, and a method for preparing the same. The present disclosure is also directed to providing a polymer electrolyte including poly(benzimidazole-co-benzoxazole) and a method for preparing the same, a polymer electrolyte membrane including the polymer electrolyte and a method for producing the same, and a membrane electrode assembly and a fuel cell using the polymer electrolyte membrane.

In one aspect, there is provided poly(benzimidazole-co-benzoxazole).

In another aspect, there is provided a polymer electrolyte including poly(benzimidazole-co-benzoxazole).

According to an embodiment, polybenzoxazole may be contained in poly(benzimidazole-co-benzoxazole) in an amount of 5 mol %-30 mol %, and particularly 10 mol %-20 mol %, in view of high proton conductivity and mechanical strength.

According to another embodiment, poly(benzimidazole-co-benzoxazole) may be represented by the following Chemical Formula 1:

[Chemical Formula 1]

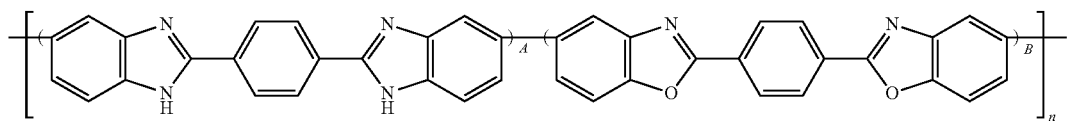

According to still another embodiment, A is 80-90 and B is 20-10 in Chemical Formula 1.

According to still another embodiment, poly(benzimidazole-co-benzoxazole) may be represented by the following Chemical Formula 2:

[Chemical Formula 2]

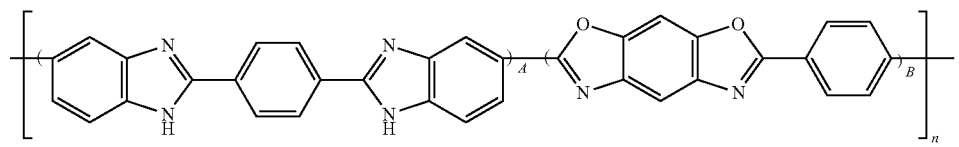

According to still another embodiment, A is 80-90 and B is 20-10 in Chemical Formula 2.

According to still another embodiment, the polymer electrolyte may be doped with phosphoric acid.

In still another aspect, there is provided a membrane obtained from the polymer electrolyte including poly(benzimidazole-co-benzoxazole).

In still another aspect, there is provided a membrane electrode assembly or fuel cell including the polymer electrolyte membrane.

In still another aspect, there is provided a method for preparing poly(benzimidazole-co-benzoxazole), including introducing benzoxazole units to polybenzimidazole to provide poly(benzimidazole-co-benzoxazole).

In still another aspect, there is provided a method for producing a polymer electrolyte, including introducing benzoxazole units to polybenzimidazole to provide poly(benzimidazole-co-benzoxazole).

According to an embodiment, polycondensation of terephthalic acid, 3,3'-diaminobenzidine, and 3,3'-dihydroxybenzidine or 4,6-diaminoresorcinol may be carried out.

According to another embodiment, polycondensation of terephthalic acid, 3,3'-diaminobenzidine, and 3,3'-dihydroxybenzidine or 4,6-diaminoresorcinol may be carried out in polyphosphoric acid (PPA).

According to still another embodiment, the polymer electrolyte including poly(benzimidazole-co-benzoxazole) may be poly(benzimidazole-co-benzoxazole) doped with phosphoric acid.

In yet another aspect, there is provided a method for producing a polymer electrolyte membrane, including casting the polycondensed poly(benzimidazole-co-benzoxazole) onto a support without additional doping with phosphoric acid, and allowing the resultant support to stand under ambient condition to provide a polymer electrolyte membrane doped with phosphoric acid in situ.

According to the present disclosure, it is possible to provide a polymer electrolyte material having both high proton conductivity and excellent mechanical properties even when the polymer electrolyte material is obtained by in-situ phosphoric acid doping. The polymer electrolyte material may substitute for the conventional phosphoric acid-doped polybenzimidazole in a polymer electrolyte membrane fuel cell, particularly in a high-temperature polymer electrolyte membrane fuel cell.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Exemplary embodiments now will be described more fully hereinafter with reference to the accompanying drawings, in which exemplary embodiments are shown.

Polybenzimidazole doped with acid at a high level has high proton conductivity but low mechanical strength. On the contrary, polybenzimidazole doped with acid at a low level has low proton conductivity but high mechanical strength.

The inventors have conducted many studies to solve the problem caused by acid doping of polybenzimidazole, i.e. degradation of mechanical strength accompanied with improvement of proton conductivity. We have now found that poly(benzimidazole-co-benzoxazole) (PBI-co-PBO) is a novel material providing high proton conductivity while not causing degradation of mechanical strength.

In other words, benzoxazole (BO) units are introduced to the backbone of polybenzimidazole to control a doping degree of phosphoric acid. In this manner, it is possible to improve mechanical strength without any loss of proton conductivity. Since benzoxazole units have lower basicity than benzimidazole (BI) units, they allow control of a doping level (doping degree), and thus a benzoxazole unit-containing copolymer may have good mechanical strength after doping.

As non-limiting example, poly(benzimidazole-co-benzoxazole) disclosed herein may be represented by the following Chemical Formula 1 or 2:

[Chemical Formula 1]

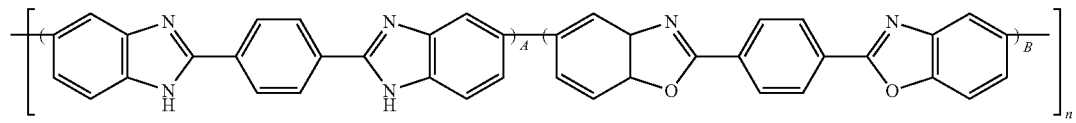

[Chemical Formula 2]

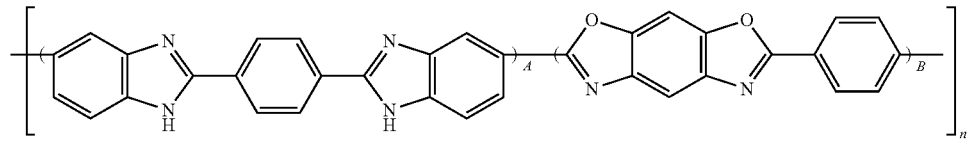

Figure 1:
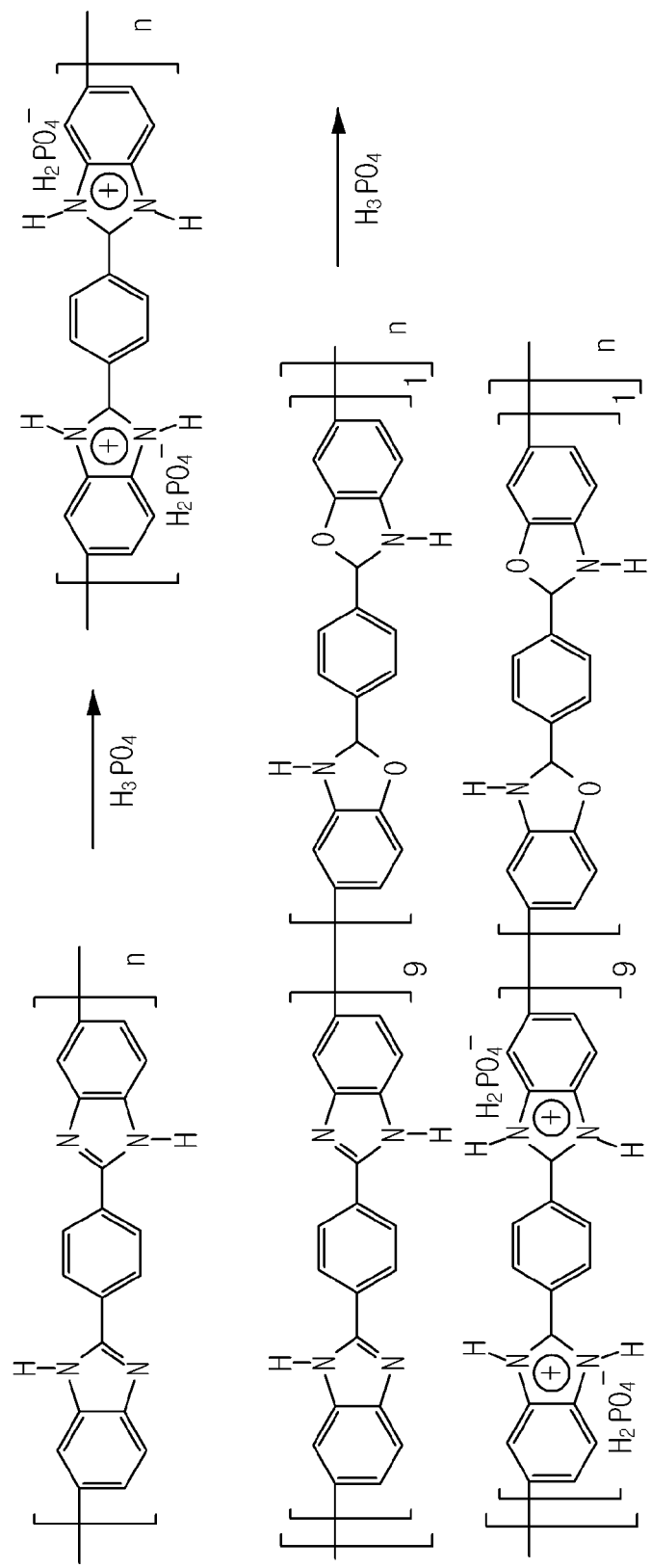
FIG. 1 shows phosphoric acid doping in Example 1 in comparison with the conventional phosphoric acid-doped polybenzimidazole.

FIG. 1 shows phosphoric acid doping in Example 1 (described hereinafter) in comparison with the conventional phosphoric acid-doped polybenzimidazole.

As shown in FIG. 1, in poly(benzimidazole-co-benzoxazole) containing benzoxazole units, the polybenzoxazole segments are not doped. Thus, it is possible to control the doping level by adjusting the content of the polybenzoxazole segments, thereby providing a polymer electrolyte having both high proton conductivity and high mechanical strength. The resultant poly(benzimidazole-co-benzoxazole) may be subjected directly to casting to provide a membrane in situ, and to obtain a poly(benzimidazole-co-benzoxazole) electrolyte membrane doped with phosphoric acid. The in situ obtained poly(benzimidazole-co-benzoxazole) electrolyte membrane doped with phosphoric acid provides high proton conductivity while not causing degradation of mechanical strength, despite its in-situ manufacturing.

According to some embodiments, benzoxazole units are introduced to polybenzimidazole to provide poly(benzimidazole-co-benzoxazole). Herein, poly(benzimidazole-co-benzoxazole) may be obtained by polycondensation with polyphosphoric acid. Through such polycondensation with polyphosphoric acid, it is possible to obtain poly(benzimidazole-co-benzoxazole) membrane doped with phosphoric acid in situ.

Figure 2:
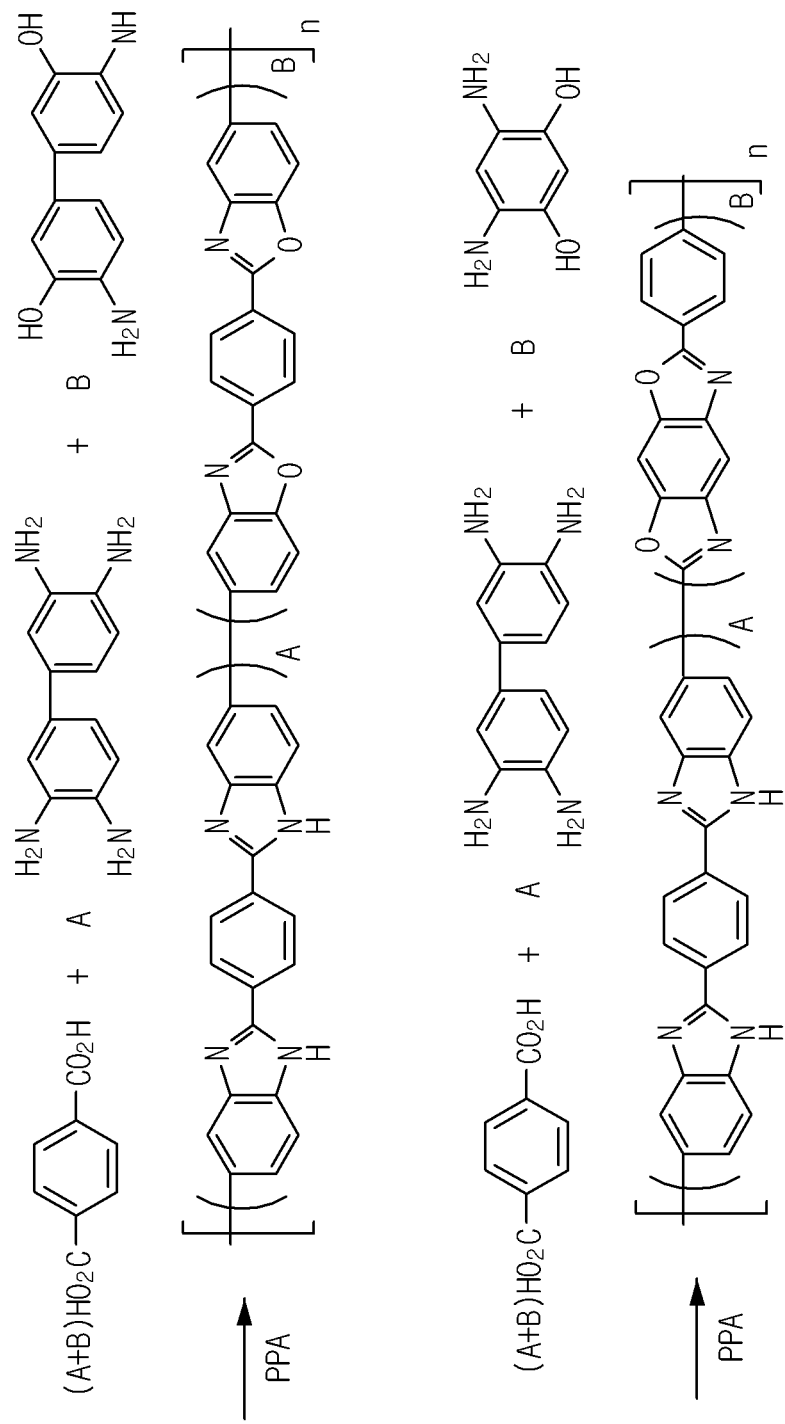
FIG. 2 is a reaction scheme illustrating the synthesis of poly(benzimidazole-co-benzoxazole) according to Examples.

FIG. 2 is a reaction scheme illustrating the synthesis of poly(benzimidazole-co-benzoxazole) according to Examples. In FIG. 2, A represents benzimidazole units and B represents benzoxazole units. For example, A is 80-90 and B is 20-10.

As shown in FIG. 2, polycondensation of terephthalic acid, 3,3'-diaminobenzidine, and 3,3'-dihydroxybenzidine may be carried out in polyphosphoric acid (PPA) to obtain a copolymer, poly(benzimidazole-co-benzoxazole). The polycondensation may be carried out by using 4,6-diaminoresorcinol instead of 3,3'-dihydroxybenzidine.

The resultant copolymer is subjected to casting in situ from the polymerized mixture without any additional acid doping process. Then, the resultant product is allowed to stand under ambient condition to obtain a poly(benzimidazole-co-benzoxazole) membrane doped with phosphoric acid in situ through the hydrolysis of polyphosphoric acid.

In the case of the phosphoric acid-doped poly(benzimidazole-co-benzoxazole) membrane, the phosphoric acid doping level decreases as the content of polybenzoxazole units increases, resulting in degradation of the quality of a cell and proton conductivity. However, the phosphoric acid-doped poly(benzimidazole-co-benzoxazole) membrane shows higher mechanical strength as compared to a phosphoric acid-doped polybenzimidazole membrane.

Therefore, the phosphoric acid-doped poly(benzimidazole-co-benzoxazole) membrane may substitute for the conventional phosphoric acid-doped polybenzimidazole membrane as an electrolyte membrane for a polymer electrolyte membrane fuel cell, particularly for a high-temperature polymer electrolyte membrane fuel cell.

The present disclosure also provides a membrane-electrode assembly including the phosphoric acid-doped poly(benzimidazole-co-benzoxazole) membrane, as well as a fuel cell, particularly a polymer electrolyte membrane fuel cell, and more particularly for a high-temperature polymer electrolyte membrane fuel cell, including the membrane-electrode assembly.

The examples and experiments will now be described. The following examples and experiments are for illustrative purposes only and not intended to limit the scope of the present disclosure.

[Sample Preparation]

3,3'-diaminobenzidine (99%), 3,3'-dihydroxybenzidine (99%) and 4,6-diaminoresorcinol dihydrochloride (>99%) are purchased from Tokyo Chemical Industry (TCI). Terephthalic acid (>99%) and isophthalic acid (>99%) are purchased from Acros Company. Phosphoric acid (85%) and polyphosphoric acid (PPA; 115% phosphoric acid) are purchased from Aldrich Company. The materials are used as they are. To produce a membrane-electrode assembly, 46.1 wt % platinum-supported carbon (Pt/C) catalyst (available from Tanaka Company), gas diffusion cloth having a microporous layer (HT1410-W available from E-Tech Company) and 60 wt % aqueous PTFE dispersion are used.

Synthesis, Manufacture of Membrane and Test

EXAMPLE 1

PBI-co-PBO 1 (0.9:0.1)

3,3-diaminobenzidine (3.47 g, 16.2 mmol), 3,3'-dihydroxybenzidine (0.39 g, 1.8 mmol) and terephthalic acid (3.00 g, 18 mmol) are charged to a three-necked flask equipped with a condenser and a mechanical stirrer. Under argon atmosphere, polyphosphoric acid (PPA) is introduced to the reaction flask.

The reaction mixture is maintained at a reaction temperature of 150° C. for 5 hours, and then at 220° C. for 15 hours. The resultant viscous polymer solution is cast onto a glass plate and applied by a doctor blade to obtain a poly(benzimidazole-co-benzoxazole) membrane having a uniform thickness (30 μm).

The membrane is allowed to stand under ambient condition (25° C., relative humidity 45%) to perform hydrolysis of polyphosphoric acid. In this manner, a poly(benzimidazole-co-benzoxazole) membrane doped with phosphoric acid in situ is obtained, and additional acid doping is not carried out.

The resultant poly(benzimidazole-co-benzoxazole) copolymer has a ratio of benzimidazole units:benzoxazole units of 0.9:0.1.

EXAMPLE 2

PBI-co-PBO 1 (0.5:0.5)

Example 1 is repeated, except that a different ratio of comonomers is used. In other words, 3,3-diaminobenzidine (1.93 g, 9 mmol), 3,3'-dihydroxybenzidine (1.95 g, 9 mmol) and terephthalic acid (3.00 g, 18 mmol) are used. The resultant poly(benzimidazole-co-benzoxazole) copolymer has a ratio of benzimidazole units:benzoxazole units of 0.5:0.5.

EXAMPLE 3

PBI-co-PBO 2 (0.9:0.1)

Example 1 is repeated, except that 4,6-diaminoresorcinol is used instead of 3,3'-dihydroxybenzidine. In other words, 3,3-diaminobenzidine (3.47 g, 16.2 mmol), 4,6-diaminoresorcinol dihydrochloride (0.38 g, 1.8 mmol) and terephthalic acid (3.00 g, 18 mmol) are used. The resultant poly(benzimidazole-co-benzoxazole) copolymer has a ratio of benzimidazole units:benzoxazole units of 0.9:0.1.

COMPARATIVE EXAMPLE 1

PBI

Example 1 is repeated, except that neither 3,3'-dihydroxybenzidine nor 4,6-diaminoresorcinol is used. In other words, 3,3-diaminobenzidine (3.86 g, 18 mmol) and terephthalic acid (3.00 g, 18 mmol) are used. In this manner, a polybenzimidazole homopolymer membrane doped with phosphoric acid in situ is obtained.

The acid-doped membranes obtained from the above Examples and Comparative Example 1 are dried in an oven for 12 hours to remove the remaining water. Then, phosphoric acid in each membrane is treated with ammonium hydroxide, and the resultant acid-free (dedoped) membranes are dried in a vacuum oven at 80° C. for 24 hours. The difference in weight between the phosphoric acid-doped membrane and acid-free membrane is measured to determine the doping level. The acid doping level means mols of phosphoric acid per unit mol of polybenzimidazole.

A four-platinum wire cell and IM6 spectrometer (Zahner elektrik Inc.) are used to measure proton conductivity. The systems are set to a galvanostat mode with a frequency range of 1 Hz-1 MHz. Each membrane is cut into a size of 1×4 cm$^2$ and placed into a temperature-controlled chamber (30-170° C.) under nitrogen atmosphere to form an anhydrous condition. Ion conductivity is calculated according to the following Equation 1:

$$\sigma = \frac{L}{A \times R} \quad \text{[Equation 1]}$$

wherein L is a distance between electrodes fixed at 1 cm, R represents resistance, A is the sectional area of a membrane, and σ represents ion conductivity.

To carry out thermogravimetric analysis (TGA), each membrane is wiped with paper to remove phosphoric acid on the surface. Each membrane is tested under nitrogen atmosphere up to 1000° C. at a heating rate of 10° C./minute (Universal V 4.2E TA Instruments, 2050 TGA used).

A membrane sample is prepared according to ASTM Standard D 638. Tensile strength is measured by using H5KT system (Tinius Olsen; a cross-head speed of 10 mm/min.) at room temperature under ambient humidity.

[Production of Membrane-Electrode Assembly]

Polytetrafluoroethylene and a polybenzimidazole binder are used to produce a membrane-electrode assembly.

[Results]

Figure 3:
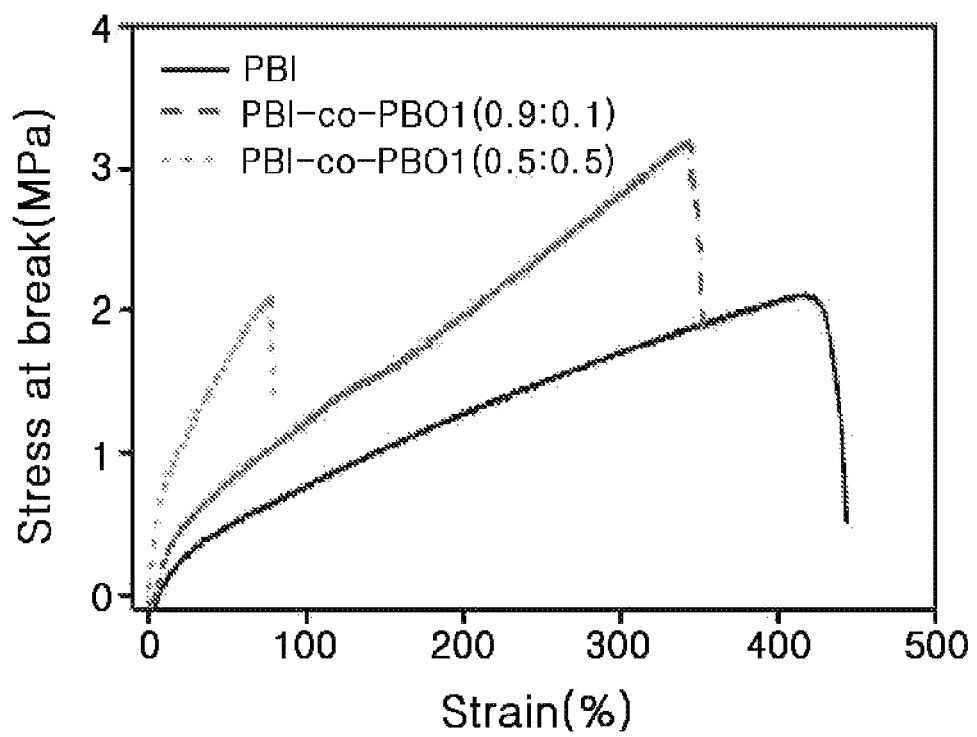
FIG. 3 is a graph illustrating the mechanical properties of poly(benzimidazole-co-benzoxazole) copolymers containing benzoxazole units in a different molar ratio (10 mol % and 50 mol %) in the polymer backbone, together with the mechanical properties of polybenzimidazole.

FIG. 3 is a graph illustrating the mechanical properties of poly(benzimidazole-co-benzoxazole) copolymers containing benzoxazole units in a different molar ratio (10 mol % and 50 mol %) in the polymer backbone, together with the mechanical properties of polybenzimidazole. In FIG. 3, x-axis represents a strain (%) and y-axis represents stress at break (MPa).

As shown in FIG. 3, the poly(benzimidazole-co-benzoxazole) copolymer membrane has the maximum stress at break of 3.4 MPa when benzoxazole units are present at 10 mol %. This is 1.7 times higher than the maximum stress at break of a polybenzimidazole membrane. The strain decreases as benzoxazole units increase.

When benzoxazole units are present at 50 mol %, the stress at break is similar to the stress at break of polybenzimidazole. However, in this case, the strain is 76% (see the dot-line graph at the left portion of FIG. 3), which is about 20% of the strain of polybenzimidazole (see the solid-line graph at the right portion of FIG. 3).

Figure 4:
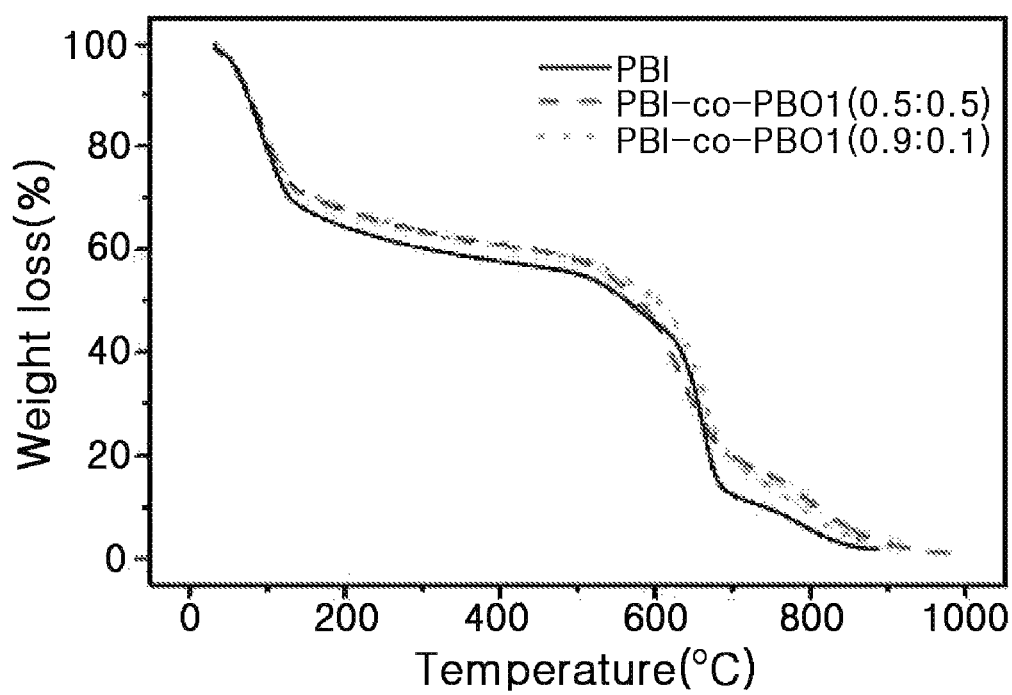
FIG. 4 is a graph illustrating the thermal stability of poly(benzimidazole-co-benzoxazole) copolymers according to Examples.

FIG. 4 is a graph illustrating the thermal stability of poly(benzimidazole-co-benzoxazole) copolymers according to Examples. In FIG. 4, x-axis represents temperature (° C.) and y-axis represents weight loss (%).

Thermogravimetric analysis (TGA) is carried out under nitrogen atmosphere at a heating rate of 10° C./min. The results demonstrate that all types of poly(benzimidazole-co-benzoxazole) copolymers are stable up to 600° C.

The first weight loss is determined at a temperature between room temperature and 130° C. It is believed that this results from the loss of free water in a membrane.

The second weight loss is caused by the loss of water produced by dimerization of phosphoric acid. For reference, in a dry condition, phosphoric acid undergoes dehydration to form diphosphoric acid. The third weight loss occurs at 600° C. or higher due to the decomposition of the polymer main chain. In the case of the second weight loss, m-polybenzimidazole shows a greater weight loss as compared to the other poly(benzimidazole-co-benzoxazole) copolymers. This suggests that m-polybenzimidazole contains phosphoric acid in the membrane in a larger amount as compared to the other poly(benzimidazole-co-benzoxazole) copolymers. In the second decomposition temperature range, the copolymers containing benzoxazole units in an amount of 10 mol % and 50 mol % show a similar weight loss. This means that the two types of samples have a similar acid doping level.

The above results conform to the results of the acid doping level of each membrane. The following Table 1 shows the properties of poly(benzimidazole-co-benzoxazole) in comparison with those of polybenzimidazole.

TABLE 1

| Materials of Membrane | Acid doping level (phosphoric acid (mol)/copolymer units (mol)) | Stress at break (MPa) | Conductivity at 170° C. (S/cm) |
|---|---|---|---|
| Comp. Ex. 1 (Polybenzimidazole) | 22.6 | 2.0 | $1.29 \times 10^{-1}$ |
| Ex. 1 [Poly(benzimidazole-co-benzoxazole) (BI:BO = 0.9:0.1)] | 13.8 | 3.4 | $1.09 \times 10^{-1}$ |
| Ex. 2 [Poly(benzimidazole-co-benzoxazole) (BI:BO = 0.5:0.5)] | 13.3 | 2.1 | $9.56 \times 10^{-2}$ |
| Ex. 3 [Poly(benzimidazole-co-benzoxazole) (BI:BO = 0.9:0.1)] | 13.1 | 4.1 | $8.78 \times 10^{-2}$ |

Figure 5:
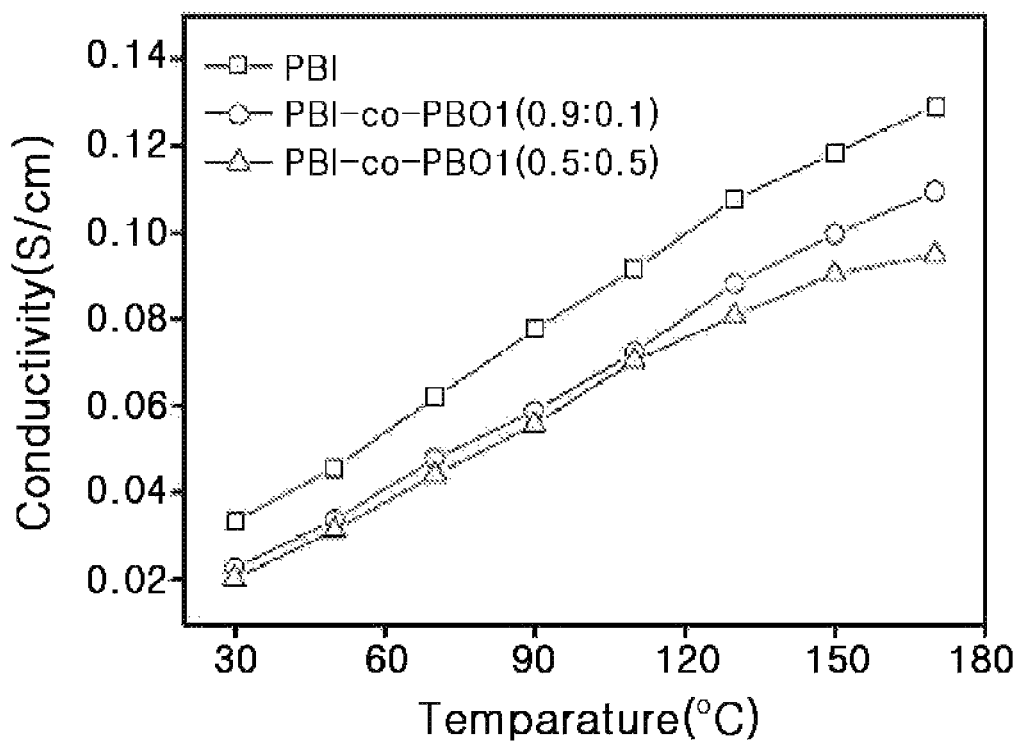
FIG. 5 is a graph illustrating proton conductivities of poly(benzimidazole-co-benzoxazole) copolymers measured at different temperatures.

FIG. 5 is a graph illustrating proton conductivities of poly(benzimidazole-co-benzoxazole) copolymers measured at different temperatures. In FIG. 5, x-axis represents temperature (° C.) and y-axis represents conductivity (S/cm).

As shown in FIG. 5, conductivity increases as temperature increases. However, as benzoxazole units increase, conductivity decreases slightly. At 30° C., polybenzimidazole has a conductivity of 0.33 S/cm, and the poly(benzimidazole-co-benzoxazole) copolymer containing 10 mol % of benzoxazole units has a conductivity of 0.23 S/cm. In other words, in the case of the copolymer containing 10 mol % of benzoxazole units shows a drop in conductivity of about 30% at 30° C. However, as temperature increases, the difference in conductivity between polybenzimidazole and poly(benzimidazole-co-benzoxazole) copolymer is decreased to about 15%. It is thought that such a decrease in conductivity results from a decrease in phosphoric acid doping level.

As shown in Table 1, the phosphoric acid doping level decreases, as the benzoxazole units in poly(benzimidazole-co-benzoxazole) copolymer forming a polymer membrane increase.

The poly(benzimidazole-co-benzoxazole) copolymer membrane of Example 1 shows a decrease in acid doping level of 40% in comparison with Comparative Example 1, and has a mechanical strength 1.7 times higher than Comparative Example 1. On the other hand, the ion conductivity decreases merely by 15% at 170° C. in comparison with the m-polybenzimidazole membrane of Comparative example 1.

The poly(benzimidazole-co-benzoxazole) copolymer membrane of Example 3 shows a stress at break of 4.1 MPa, which corresponds to two times of the stress at break of the membrane of Comparative Example 1.

It is interesting that the poly(benzimidazole-co-benzoxazole) copolymer membrane of Example 3 has a lower acid doping level, and thus higher mechanical properties, as compared to the poly(benzimidazole-co-benzoxazole) copolymer membrane of Example 1.

Figure 6:
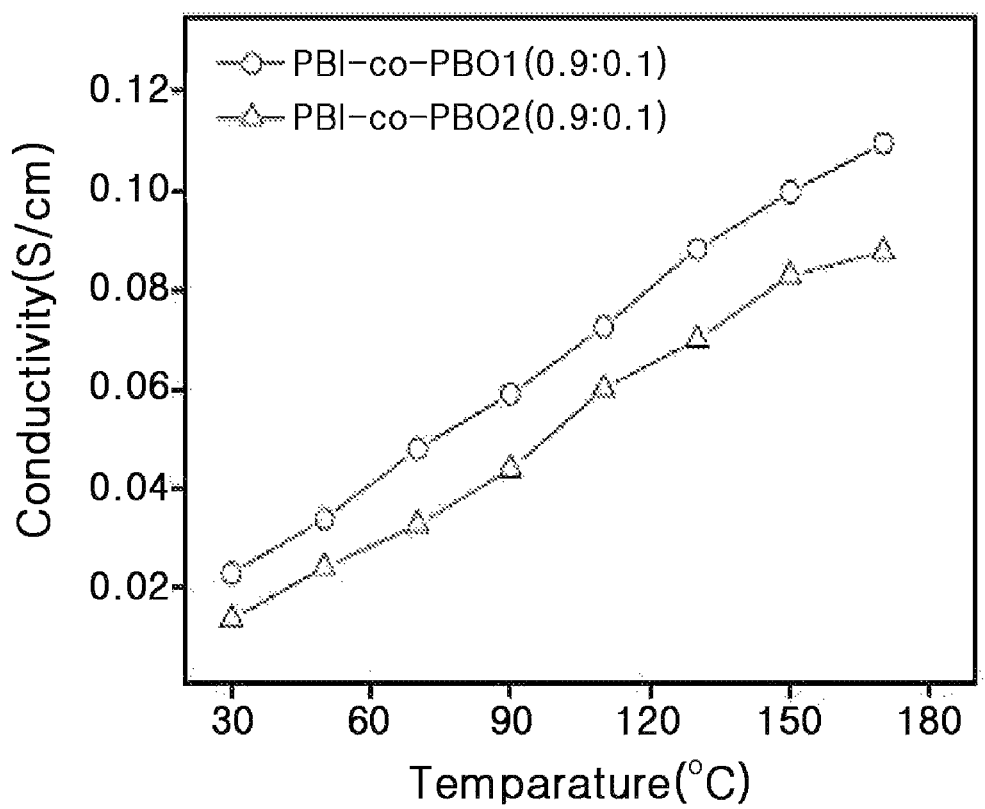
FIG. 6 is a graph illustrating the conductivities of the membranes according to Example 1 and Example 3 as a function of temperature.

FIG. 6 is a graph illustrating the conductivities of the membranes according to Example 1 and Example 3 (using different types of benzoxazole units) as a function of temperature. In FIG. 6, x-axis represents temperature (° C.) and y-axis represents conductivity (S/cm).

As can be seen from FIG. 6, the poly(benzimidazole-co-benzoxazole) copolymer membrane of Example 1 has the maximum proton conductivity of 0.11 S/cm, while the poly(benzimidazole-co-benzoxazole) copolymer membrane of Example 3 has the maximum proton conductivity of 0.088 S/cm. The copolymer of Example 1 and the copolymer of Example 3 have an acid doping level of 13.8 mmol and 13.1 mmol, respectively, per unit mol of copolymer.

Therefore, it can be seen from the foregoing that even when two copolymers have the same proportion of benzoxazole units in each copolymer structure, they have different acid doping levels and proton conductivity values depending on the structure of polybenzoxazole (PBO). In other words, benzoxazole units affect proton conductivity. Thus, it can be seen that it is possible to control proton conductivity and mechanical strength by controlling the type and amount of benzoxazole units.

Figure 7A:
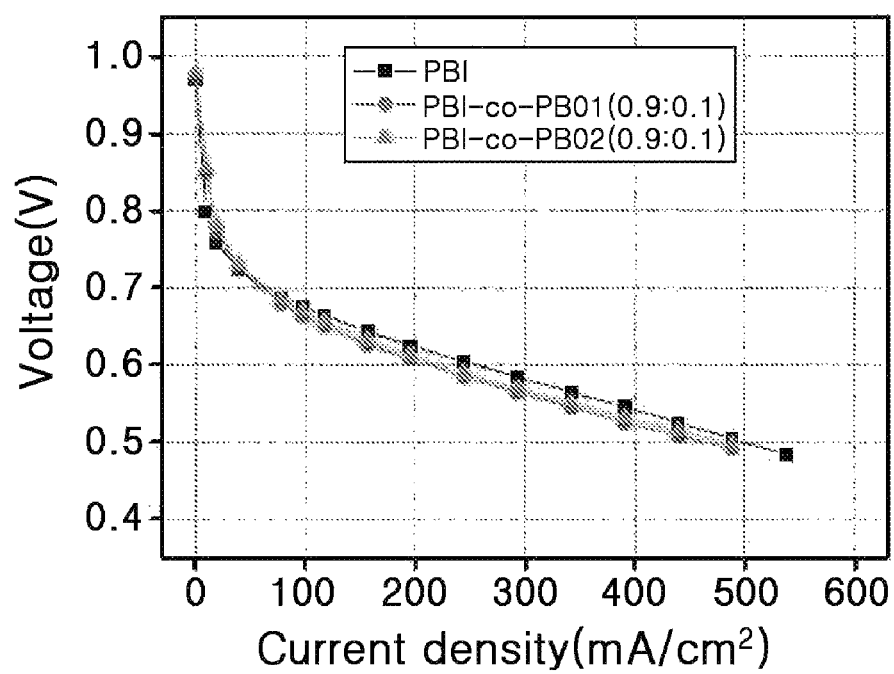
FIGS. 7A and 7B are graphs illustrating the quality of each of the cells using the membranes according to Comparative Example 1 and Examples.
Figure 7B:
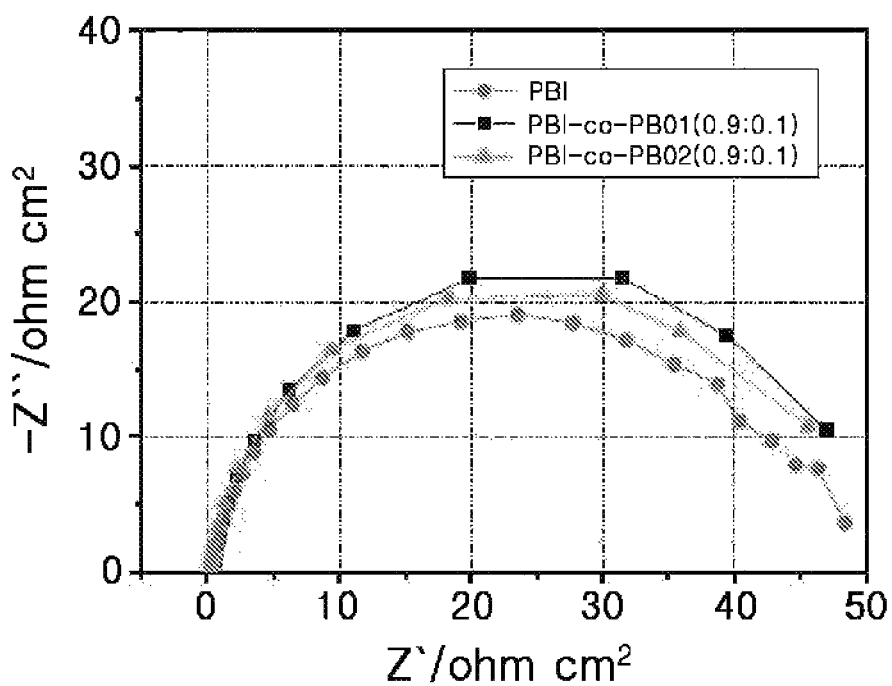

FIGS. 7A and 7B are graphs illustrating the quality of each of the cells using the membranes according to Comparative Example 1 and Examples. In FIG. 7A, x-axis represents current density (mA/cm²) and y-axis represents voltage(V). FIG. 7B is a graph analyzing impedance in electrochemistry. In FIG. 7B, x-axis and y-axis represent impedance (ohm·cm²). For reference, in FIGS. 7A and 7B, the tests are carried out the following conditions: 150° C., anhydrous, ambient pressure, H₂ 100 sccm, air 300 sccm.

As can be seen from FIG. 7, the membrane of Comparative Example 1 provides the highest quality and the membranes of Examples also provide similar quality. After carrying out analysis of electrochemical impedance, it can be seen that Comparative Example 1 and Examples provide a similar ohmic resistance value.

The following Table 2 shows the results of quality of a unit cell including the OCV value, current density at 0.6V and current density at 0.5V when using the membranes of Comparative Example 1 and Examples 1 and 3.

TABLE 2

| Membrane | OCV (V) | @ 0.6 V (mA/cm²) | @ 0.5 V (mA/cm²) |
|---|---|---|---|
| Comp. Ex. 1 | 0.970 | 253 | 498 |
| Ex. 1 | 0.973 | 210 | 463 |
| Ex. 3 | 0.979 | 220 | 478 |

As can be seen from Table 2, Comparative Example 1 and Examples 1 and 3 provide an OCV value of 0.970V, 0.973V and 0.979V, which are similar. Comparative Example 1 and Examples 1 and 3 provide a current density at 0.6V of 253 mA/cm², 210 mA/cm² and 220 mA/cm², respectively, and a current density at 0.5V of 498 mA/cm², 463 mA/cm² and 478 mA/cm², respectively. Since the quality of a unit cell depends on the doping level of a polymer, Comparative Example 1 shows a higher current density as compared to Examples 1 and 3. Although the polybenzoxazole polymers according to Examples 1 and 3 provide slightly lower quality of a unit cell as compared to the polybenzimidazole homopolymer according to Comparative Example 1, they are more suitable as electrolyte membranes of polymer electrolyte membrane fuel cells, particularly high-temperature polymer electrolyte membrane fuel cells, considering their strong mechanical properties.

While the exemplary embodiments have been shown and described, it will be understood by those skilled in the art that various changes in form and details may be made thereto without departing from the spirit and scope of the present disclosure as defined by the appended claims.

What is claimed is:

1. Poly(benzimidazole-co-benzoxazole) having polybenzimidazole to which benzoxazole units are introduced, wherein the poly(benzimidazole-co-benzoxazole) consists of the following recurring benzimadazole units

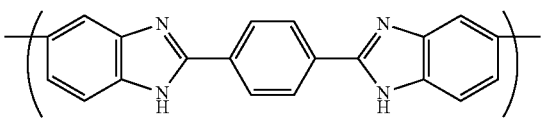

and the following recurring benzoxazole units

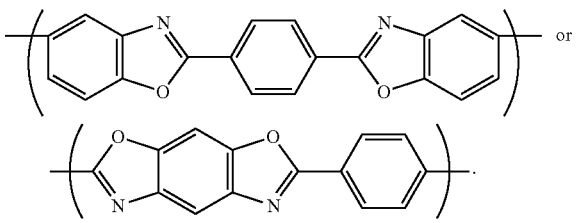

2. The poly(benzimidazole-co-benzoxazole) according to claim 1, wherein the polybenzoxazole is contained in poly(benzimidazole-co-benzoxazole) in an amount of 5 mol %-30 mol %.

3. The poly(benzimidazole-co-benzoxazole) according to claim 1, wherein the recurring benzimadazole units and recurring benzoxazole units are represented by the following Chemical Formula 1 or 2:

[Chemical Formula 1]

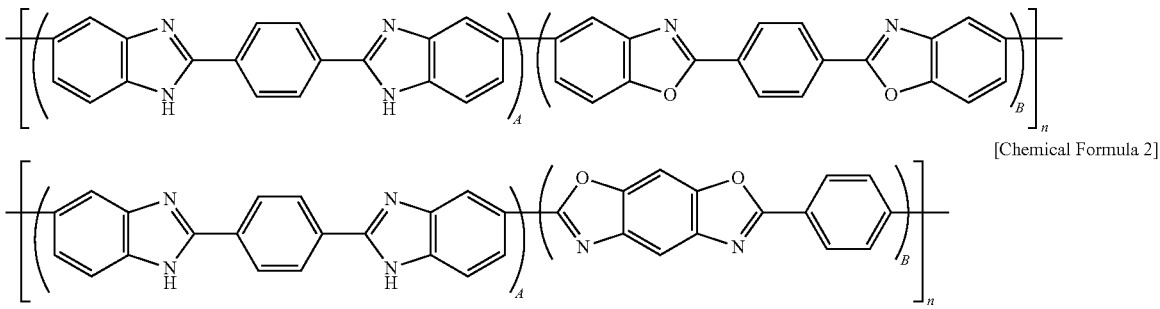

[Chemical Formula 2]

wherein A is 80-90 and B is 20-10.

4. A method for preparing the poly(benzimidazole-co-benzoxazole) according to claim 1, comprising introducing benzoxazole units to polybenzimidazole.

5. The method for preparing poly(benzimidazole-co-benzoxazole) according to claim 4, wherein polycondensation of terephthalic acid, 3,3'-diaminobenzidine, and 3,3'-dihydroxybenzidine or 4,6-diaminoresorcinol is carried out to provide the poly(benzimidazole-co-benzoxazole).

6. The method for preparing poly(benzimidazole-co-benzoxazole) according to claim 4, wherein polycondensation of terephthalic acid, 3,3'-diaminobenzidine, and 3,3'-dihydroxybenzidine or 4,6-diaminoresorcinol is carried out in polyphosphoric acid (PPA) to provide the poly(benzimidazole-co-benzoxazole).

7. The poly(benzimidazole-co-benzoxazole) according to claim 1, which is represented by Chemical Formula 1.

8. The poly(benzimidazole-co-benzoxazole) according to claim 1, which is represented by Chemical Formula 2.

9. The poly(benzimidazole-co-benzoxazole) according to claim 1, wherein the poly(benzimidazole-co-benzoxazole) has a mole ratio of benzimidazole units to benzoxazole units of at least 0.9:0.1 and not more than 0.5:0.5.

10. The poly(benzimidazole-co-benzoxazole) according to claim 1, wherein polybenzoxazole is contained in the poly (benzimidazole-co-benzoxazole) in an amount of 10 mol %-20 mol %.

11. A polymer electrolyte comprising the poly(benzimidazole-co-benzoxazole) according to claim 1.

12. The polymer electrolyte according to claim 11, wherein polybenzoxazole is contained in the poly(benzimidazole-co-benzoxazole) in an amount of 5 mol %-30 mol %.

13. The polymer electrolyte according to claim 11, wherein the poly(benzimidazole-co-benzoxazole) is represented by the following Chemical Formula 1 or 2:

[Chemical Formula 1]

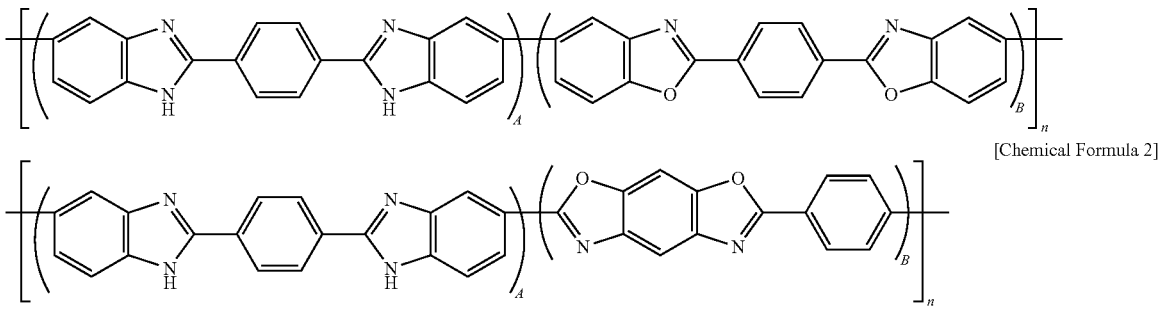

[Chemical Formula 2]

wherein A is 80-90 and B is 20-10.

14. The polymer electrolyte according to claim 11, which is doped with phosphoric acid.

15. A polymer electrolyte membrane comprising the polymer electrolyte comprising poly(benzimidazole-co-benzoxazole) as defined in claim 11.

16. A fuel cell comprising the polymer electrolyte membrane as defined in claim 15.

17. A method for preparing the polymer electrolyte according to claim 11, comprising introducing benzoxazole units to polybenzimidazole to provide the poly(benzimidazole-co-benzoxazole).

18. The method for preparing the polymer electrolyte according to claim 17, wherein polycondensation of terephthalic acid, 3,3'-diaminobenzidine, and 3,3'-dihydroxybenzidine or 4,6-diaminoresorcinol is carried out to provide the poly(benzimidazole-co-benzoxazole).

19. The method for preparing the polymer electrolyte according to claim 17, wherein polycondensation of terephthalic acid, 3,3'-diaminobenzidine, and 3,3'-dihydroxybenzidine or 4,6-diaminoresorcinol is carried out in polyphosphoric acid (PPA) to provide the poly(benzimidazole-co-benzoxazole).

20. The method according to claim 19, further comprising casting the polycondensed poly(benzimidazole-co-benzoxazole) onto a support without additional doping with phosphoric acid, and allowing the resultant support to stand under ambient condition to provide a polymer electrolyte membrane doped with phosphoric acid in situ.

* * * * *